United States Patent
Rabnawaz (10) Patent No.: US 11,053,337 B2
(45) Date of Patent: *Jul. 6, 2021

(54) OMNIPHOBIC POLYURETHANE COMPOSITIONS, RELATED ARTICLES, AND RELATED METHODS

(71) Applicant: Muhammad Rabnawaz, East Lansing, MI (US)

(72) Inventor: Muhammad Rabnawaz, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/963,896

(22) PCT Filed: Mar. 2, 2020

(86) PCT No.: PCT/US2020/020592
§ 371 (c)(1),
(2) Date: Jul. 22, 2020

(87) PCT Pub. No.: WO2020/180760
PCT Pub. Date: Sep. 10, 2020

(65) Prior Publication Data
US 2021/0002410 A1    Jan. 7, 2021

Related U.S. Application Data

(60) Provisional application No. 62/813,811, filed on Mar. 5, 2019.

(51) Int. Cl.
| | | |
|---|---|---|
| *C08G 18/12* | (2006.01) | |
| *C08K 3/013* | (2018.01) | |
| *C08G 18/48* | (2006.01) | |
| *C08G 18/50* | (2006.01) | |
| *C08G 18/61* | (2006.01) | |
| *C08G 18/62* | (2006.01) | |
| *C08G 18/69* | (2006.01) | |
| *C08G 18/78* | (2006.01) | |
| *C08G 18/79* | (2006.01) | |
| *C09D 5/16* | (2006.01) | |
| *C09D 175/04* | (2006.01) | |

(52) U.S. Cl.
CPC ......... *C08G 18/12* (2013.01); *C08G 18/4825* (2013.01); *C08G 18/5015* (2013.01); *C08G 18/61* (2013.01); *C08G 18/6204* (2013.01); *C08G 18/6216* (2013.01); *C08G 18/69* (2013.01); *C08G 18/7831* (2013.01); *C08G 18/792* (2013.01); *C08K 3/013* (2018.01); *C09D 5/1681* (2013.01); *C09D 175/04* (2013.01)

(58) Field of Classification Search
CPC .. C09D 175/00; C09D 175/04; C09D 175/06; C09D 175/08; C09D 175/10; C09D 175/12; C09D 175/14; C09D 175/16; C08G 18/61

See application file for complete search history.

(56) References Cited

U.S. PATENT DOCUMENTS

| | | |
|---|---|---|
| 2004/0087759 A1 | 5/2004 | Malik et al. |
| 2006/0035091 A1 | 2/2006 | Bruchmann et al. |
| 2018/0340075 A1 | 11/2018 | Harkal et al. |
| 2020/0048459 A1 | 2/2020 | Rabnawaz |
| 2020/0347179 A1 | 11/2020 | Rabnawaz et al. |

FOREIGN PATENT DOCUMENTS

| | | | |
|---|---|---|---|
| WO | WO-2014/097309 A1 | 6/2014 | |
| WO | WO-2019/099608 A1 | 5/2019 | |
| WO | WO-2019199713 A1 * | 10/2019 | ......... C08G 18/4829 |
| WO | WO-2020/142578 A1 | 7/2020 | |
| WO | WO-2020/160089 A1 | 8/2020 | |
| WO | WO-2020/167714 A1 | 8/2020 | |

OTHER PUBLICATIONS

International Application No. PCT/US2020/020592, International Search Report and Written Opinion, dated May 20, 2020.
U.S. Appl. No. 16/486,902, Rabnawaz et al., Methods for Forming Omniphobic Thermoset Compositions and Related Articles, filed Aug. 19, 2019.

* cited by examiner

*Primary Examiner* — Christopher M Rodd
(74) *Attorney, Agent, or Firm* — Marshall, Gerstein & Borun LLP (57) ABSTRACT

The disclosure relates to a thermoset omniphobic composition, which includes a thermoset polymer with first, second, and third backbone segments, first urethane groups linking the first and third backbone segments, and second urethane groups linking the first and second backbone segments. The first, second, and third backbone segments generally correspond to urethane reaction products of polyisocyanate(s), hydroxy-functional hydrophobic polymer(s), and polyol(s), respectively. The thermoset omniphobic composition has favorable omniphobic properties, for example as characterized by water and/or oil contact and/or sliding angles. The thermoset omniphobic composition can be used as a coating on any of a variety of substrates to provide omniphobic properties to a surface of the substrate. Such omniphobic coatings can be scratch-resistant, ink/paint resistant, dirt-repellent, and optically clear. The thermoset omniphobic composition can be applied by different coating methods including cast, spin, roll, spray and dip coating methods.

46 Claims, 4 Drawing Sheets

OMNIPHOBIC POLYURETHANE COMPOSITIONS, RELATED ARTICLES, AND RELATED METHODS

CROSS-REFERENCE TO RELATED APPLICATIONS

This is a National Stage of International Application No. PCT/US2020/020592, filed Mar. 2, 2020, which claims the benefit of U.S. Provisional Application No. 62/813,811 (filed Mar. 5, 2019), which is incorporated herein by reference in its entirety.

STATEMENT OF GOVERNMENT INTEREST

None.

BACKGROUND OF THE DISCLOSURE

Field of the Disclosure

The disclosure relates to a thermoset omniphobic composition (such as an omniphobic polyurethane composition) which includes a thermoset polymer with first, second, and third backbone segments, first urethane groups linking the first and third backbone segments, and second urethane groups linking the first and second backbone segments. The first, second, and third backbone segments generally correspond to urethane reaction products of polyisocyanate(s), hydroxy-functional hydrophobic polymer(s), and polyol(s), respectively.

Brief Description of Related Technology

Figure 1:
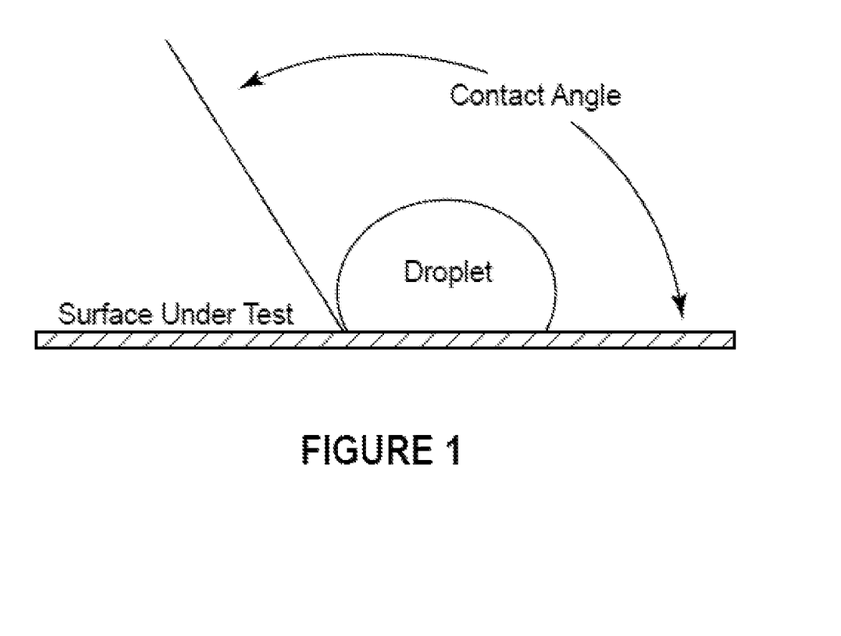
FIG. 1 is a diagram illustrating measurement of a contact angle for a liquid droplet on a surface.

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible for water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Figure 2:
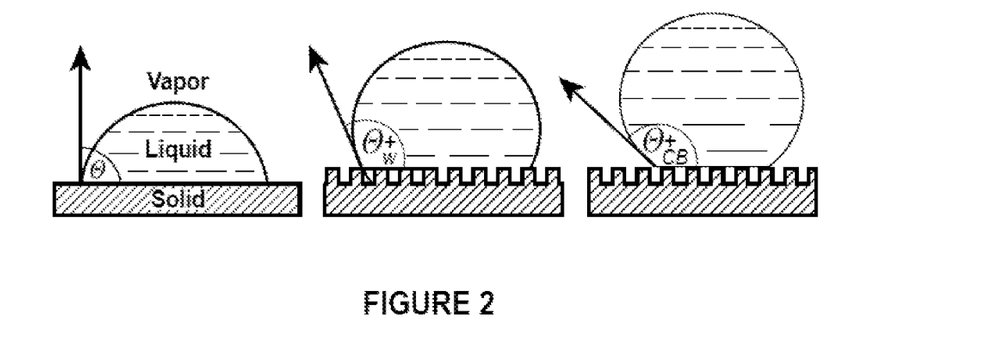
FIG. 2 is a diagram illustrating how contact angles for a given liquid droplet on a surface can vary as a function of surface topology (e.g., flat or smooth surface vs. textured surfaces).

Physically altering the surface (e.g., increasing the roughness thereof) of the material may also increase the hydrophobicity of a material. By creating pillars or other similar features on a textured surface, the water interacts with an increased surface area on the material, thus amplifying the chemical interactions between water and the surface. An image depicting how texturing the surface leads to increased contact angle can be seen below in FIG. 2.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to a thermoset omniphobic composition comprising: a thermoset polymer comprising a crosslinked backbone, the crosslinked backbone comprising: (i) first backbone segments (e.g., generally resulting from a polyisocyanate as described below), (ii) second backbone segments (e.g., generally resulting from a polysiloxane or other hydrophobic polymer as described below), (iii) third backbone segments (e.g., generally resulting from a polyol as described below), (iv) first urethane groups linking first backbone segments and third backbone segments, and (v) second urethane groups linking first backbone segments and second backbone segments; wherein: the first backbone segments have a structure corresponding to at least one of a urethane reaction product at least one polyisocyanate (e.g., a diisocyanate, a triisocyanate, a mixture of both); the second backbone segments have a structure corresponding to a urethane reaction product from at least one hydroxy-functional hydrophobic polymer having a glass transition temperature ($T_g$) of 50° C. (or 70° C.) or less; the third backbone segments have a structure corresponding to a urethane reaction product from at least one polyol; the first urethane groups have a structure corresponding to a urethane reaction product of the polyisocyanate and the polyol; and the second urethane groups have a structure corresponding to a urethane reaction product of the polyisocyanate and the hydroxy-functional hydrophobic polymer.

Various refinements of the disclosed thermoset omniphobic composition are possible.

In a refinement, the polyisocyanate comprises a diisocyanate. In another refinement, the polyisocyanate comprises a triisocyanate. In another refinement, the polyisocyanate comprises a biobased polyisocyanate. In another refinement, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a refinement, the hydroxy-functional hydrophobic polymer is selected from the group consisting of hydroxy-functional polysiloxanes, poly(fluorosiloxanes), hydroxy-functional polyperfluoroethers, hydroxy-functional polybutadienes, hydroxy-functional polyisobutylene ("PIB"), hydroxy-functional branched polyolefins, hydroxy-functional polyacrylates and polymethacrylates (e.g., also including $C_2$-$C_{16}$ pendant alkyl groups), and combinations thereof. In another refinement, the hydroxy-functional hydrophobic polymer comprises a monohydroxy-functional polysiloxane. In another refinement, the hydroxy-functional hydrophobic polymer comprises a dihydroxy-functional polysiloxane. In another refinement, the hydroxy-functional hydrophobic polymer comprises at least three hydroxy groups per polymeric chain (e.g., polyhydroxy-functional polysiloxane, such as resulting from a plurality of grafted side chains with hydroxy functionality). In another refinement, the hydroxy-functional hydrophobic polymer comprises a hydroxy-functional polyperfluoroether. In another refinement, the hydroxy-functional hydrophobic polymer comprises a hydroxy-functional polybutadiene. In another refinement, the hydroxy-functional hydrophobic polymer comprises a hydroxy-functional polyisobutene. In another refinement, the hydroxy-functional hydrophobic polymer comprises a hydroxy-functional branched polyolefin. In another refinement, the hydroxy-functional hydrophobic polymer comprises a hydroxy-functional poly(meth)acrylate. In another refinement, hydroxy-functional polysiloxanes, hydroxy-functional polyperfluoroethers, hydroxy-functional polybutadienes, hydroxy-functional polyisobutylene ("PIB"), hydroxy-functional branched polyolefins, hydroxy-functional polyacrylates and polymethacrylates, and other hydroxy-functional hydrophobic polymers can be used with a low melting point (e.g., melting point from 0-60° C.) hydrophilic polymer/oligomer such as hydroxy-functional poly(ethylene glycol) methyl ether ("PEO"). The hydrophobic polymer may have another accessory block such as a polyalkylene oxide, for example polysiloxane-polyethylene glycol (PEG) and/or polysiloxane-polypropylene glycol (PPG) block copolymers. For any of the foregoing polymers, the hydroxy-functional hydrophobic polymer can have one, two, or more than two hydroxy groups per polymeric chain. In certain embodiments, non-reactive omniphobic polymers (e.g., silicone oil, mineral oils, krytox or other polymers without a reactive group) or components with reactive groups (e.g., polysorbate or TWEEN; sorbitan ester or SPAN) can be included in an amount of 0.05-4 wt. % relative to the omniphobic composition (e.g., polyol, reactive omniphobic polymer, and polyisocyanate components) as an enhancer for the omniphobic properties.

In a refinement, the hydroxy-functional hydrophobic polymer has a glass transition temperature in a range from −150° C. to 50° C. (or 70° C.). In another refinement, the hydroxy-functional hydrophobic polymer is a liquid at a temperature in a range from −20° C. or 10° C. to 40° C.

In a refinement, the hydroxy-functional hydrophobic polymer has a molecular weight ranging from 300 to 50,000 or 200,000 g/mol.

In a refinement, the polyol comprises a diol. In another refinement, the polyol comprises a triol. In another refinement, the polyol comprises three or more hydroxyl groups. In another refinement, the polyol comprises a biobased polyol. In another refinement, the polyol is selected from the group consisting of polyether polyols, hydroxylated (meth) acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols, polyester diols, polyester polyols, polyurethane diols, polyurethane polyols, polypropylene glycols, and combinations thereof.

In a refinement, the first backbone segments are present in an amount ranging from 10 wt. % to 90 wt. % relative to the thermoset polymer. In another refinement, the second backbone segments are present in an amount ranging from 0.01 wt. % to 20 wt. % relative to the thermoset polymer. In another refinement, the third backbone segments are present in an amount ranging from 10 wt. % to 90 wt. % relative to the thermoset polymer.

In a refinement, the thermoset polymer crosslinked backbone further comprises: fourth backbone segments having a structure corresponding to a urethane reaction product of at least one monoisocyanate monomer. In a further refinement, the fourth backbone segments can be present in an amount ranging from 0.01 wt. % to 4 wt. % relative to the thermoset polymer.

In a refinement, the composition further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, polysorbates, sorbitan esters, unreactive lubricants, and combinations thereof.

In a refinement, the composition has a water contact angle in a range from 90° to 120°. In another refinement, the composition has an oil contact angle in a range from 0° or 1° to 65°. In another refinement, the composition has a water sliding angle in a range from 0° or 1° to 30° for a 75 μl droplet. In another refinement, the composition has an oil sliding angle in a range from 0° or 1° to 20° for a 10 μl or 25 μl droplet. In the case of compositions further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing compositions can range from 0° or 1° to 20° for a 25 μl droplet.

In a refinement, the composition has a composite structure comprising: a solid matrix comprising the first backbone segments and the third backbone segments; and liquid nanodomains comprising the second backbone segments, the liquid nanodomains being distributed throughout the solid matrix and having a size of 80 nm or less.

In another aspect, the disclosure relates to a coated article comprising: (a) a substrate; and (b) a thermoset omniphobic composition according to any of the variously disclosed embodiments, coated on a surface of the substrate.

Various refinements of the disclosed coated article are possible.

In a refinement, the substrate is selected from the group of metal, plastics, a different thermoset material, glass, wood, fabric (or textile), and ceramics.

In a refinement, the thermoset omniphobic composition has a thickness ranging from 0.01 µm to 500 µm.

In a refinement, the thermoset omniphobic composition coating is scratch-resistant, ink-resistant, dirt-repellent, and optically clear. For example, the coating can have a scratch resistance value of 7-10, 8-10, 9-10, or 10 as evaluated by the "Scratch Resistance" method described below. Similarly, the coating can have an ink resistance value of 7-10, 8-10, 9-10, or 10 as evaluated by the "Permanent Ink Resistance" method described below.

In another aspect, the disclosure relates to a method for forming a thermoset omniphobic composition, the method comprising: (a) reacting at least one polyisocyanate, at least one hydroxy-functional hydrophobic polymer having a glass transition temperature ($T_g$) of 50° C. (or 70° C.) or less, and at least one polyol to form a partially crosslinked reaction product; and (b) curing the partially crosslinked reaction product to form the thermoset omniphobic composition (e.g., as described above and/or according to any of the variously disclosed embodiments).

Various refinements of the disclosed method are possible.

In a refinement, the method comprises reacting the at least one polyisocyanate, the at least one hydroxy-functional hydrophobic polymer, and the at least one polyol to form the partially crosslinked reaction product (i) at temperature from 20° C. or 40° C. to 80° C. or 100° C. and (ii) for a time from 5 min to 300 min or 1000 min. In a further refinement, the method comprises curing the partially crosslinked reaction product to form the thermoset omniphobic composition (i) at temperature from 20° C. to 30° C. or 120° C. and (ii) for a time from 1 hr or 4 hr to 240 hr. In a further refinement, the method comprises reacting the at least one polyisocyanate, the at least one hydroxy-functional hydrophobic polymer, and the at least one polyol to form the partially crosslinked reaction product in a reaction solvent comprising one or more of a ketone (or mixtures of ketones), an ester (or mixtures of esters), dimethyl formamide, and dimethyl carbonate. In a refinement, catalysts (e.g., tin(II), tertiary amines) can be added to the reactant mixture to increase the reaction rate and promote crosslinking and curing under mild (temperature) conditions.

In a refinement, the method comprises mixing while reacting the at least one polyisocyanate, the at least one hydroxy-functional hydrophobic polymer, and the at least one polyol to form the partially crosslinked reaction product.

In a refinement, reacting the at least one polyisocyanate, the at least one hydroxy-functional hydrophobic polymer, and the at least one polyol to form the partially crosslinked reaction product comprises: reacting the at least one polyisocyanate and the at least one hydroxy-functional hydrophobic polymer in the absence of the at least one polyol to form an initial reaction product; and reacting the at least one polyol with the initial reaction product to form partially crosslinked reaction product.

In a refinement, curing the partially crosslinked reaction product to form the thermoset omniphobic composition comprises: adding a casting solvent to the partially crosslinked reaction product; applying the casting solvent and the partially crosslinked reaction product to a substrate; drying the substrate to remove the casting solvent, thereby forming a coating of the partially crosslinked reaction product on the substrate; and curing the coating of the partially crosslinked reaction product on the substrate, thereby forming a coating of the thermoset omniphobic composition on the substrate.

In a further refinement, the method comprises performing one or more of spraying, casting, rolling, and dipping to apply the casting solvent and the partially crosslinked reaction product to the substrate.

In a refinement, curing the partially crosslinked reaction product to form the thermoset omniphobic composition comprises: applying the partially crosslinked reaction product to a substrate; drying the substrate, thereby forming a coating of the partially crosslinked reaction product on the substrate; and curing the coating of the partially crosslinked reaction product on the substrate, thereby forming a coating of the thermoset omniphobic composition on the substrate. In a further refinement, the method comprises performing one or more of spraying, casting, rolling, and dipping to apply the partially crosslinked reaction product to the substrate. In another refinement, the method comprises reacting the at least one polyisocyanate, the at least one hydroxy-functional hydrophobic polymer, and the at least one polyol to form the partially crosslinked reaction product in a reaction solvent; applying the partially crosslinked reaction product in the reaction solvent to a substrate; and drying the substrate, thereby removing at least some of the reaction solvent and forming a coating of the partially crosslinked reaction product on the substrate.

While the disclosed methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to a thermoset omniphobic composition which includes a thermoset polymer with first, second, and third backbone segments, first urethane groups linking the first and third backbone segments, and second urethane groups linking the first and second backbone segments. The first, second, and third backbone segments generally correspond to urethane reaction products of polyisocyanate(s), hydroxy-functional hydrophobic polymer(s), and polyol(s), respectively. The thermoset omniphobic composition has favorable omniphobic properties, for example as characterized by water and/or oil contact and/or sliding angles. The thermoset omniphobic composition can be used as a coating on any of a variety of substrates to provide omniphobic properties to a surface of the substrate. Such omniphobic coatings can be scratch resistant, ink/paint resistant (e.g., as an anti-graffiti coating), and/or optically clear.

The disclosed composition includes a polymer that can be used as a coating with the ability to bind to metal, glass, wood, fabrics, and ceramics with relative ease, in particular due to the strong adhesive properties of its urethane group constituents. The polymer coating has an omniphobic quality, repelling water, oils, inks, and spray paints, thus allowing for a coating that not only has typical hydrophobic and oleophobic properties, but also protects a surface from pen inks and various paints. The final polymer product is optically clear (even for relatively thick coatings), making it an ideal choice for coating computer and phone screens as well as windows. The polymer can be manufactured without fluorine as a component and/or as a one-pot reaction process, thus reducing the overall cost when compared to products currently manufactured. Coatings formed from the polymer composition are durable due to the final crosslinked thermoset matrix. The composition can be used in water-repellent, oil-repellent, anti-fingerprint, anti-smudge, and/or anti-graffiti coatings or paints.

Omniphobic Composition

Figure 3:
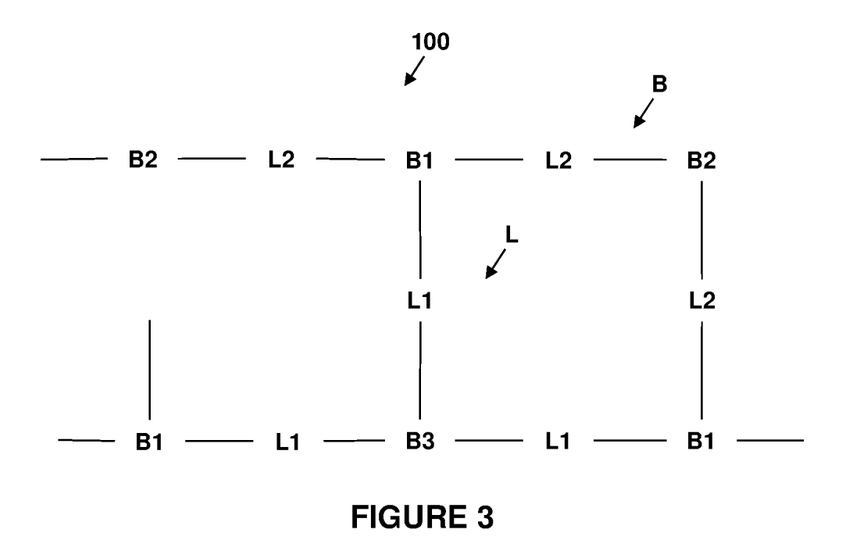
FIG. 3 illustrates a thermoset omniphobic composition according to the disclosure.

FIG. 3 illustrates a thermoset omniphobic composition according to the disclosure. FIG. 3 qualitatively illustrates various backbone segments (B) and linking groups (L) in a crosslinked thermoset polymer 100. The thermoset polymer 100 includes a crosslinked backbone B, which in turn includes (i) first backbone segments B1, (ii) second backbone segments B2, (iii) third backbone segments B3, (iv) first urethane (or carbamate) linking groups L1 linking first backbone segments and third backbone segments, and (v) second urethane (or carbamate) linking groups L2 linking first backbone segments and second backbone segments. As described in more detail below, the first backbone segments B1 generally result from a polyisocyanate (e.g., monomer, oligomer, or polymer), the second backbone segments B2 generally result from a polysiloxane or other hydrophobic polymer, and the third backbone segments B3 generally result from a polyol (e.g., monomer, oligomer, or polymer). The first and second urethane (or carbamate) linking groups L1 and L2 can be represented by the general structure —$NR_1$—C(=O)O—, where $R_1$ can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_1$ groups (such as when multiple different reactive components are used). $R_1$ can be the same or different between the linking group L1 and the linking group L2.

The first backbone segments B1 generally have a structure corresponding to at least one of a urethane reaction products from at least one polyisocyanate (e.g., diisocyanate, triisocyanate, or higher degree of isocyanate functionality) with a polyol (urethane) or a hydroxy-functional hydrophobic polymer (urethane). The first backbone segments B1 can result from a single polyisocyanate (e.g., a diisocyanate, a triisocyanate) species or a blend of two or more different polyisocyanate species with the same or different degree of isocyanate functionality.

The second backbone segments B2 have a structure corresponding to a urethane reaction product from at least one hydroxy-functional hydrophobic polymer having a glass transition temperature ($T_g$) of 50° C. or less or 70° C. or less (e.g., monohydroxy-functional, dihydroxy-functional, or higher degree of hydroxy functionality) and a polyisocyanate. In various embodiments, the hydroxy-functional hydrophobic polymer has a glass transition temperature in a range from −150° C. to 50° C. or −150° C. to 70° C. (e.g., at least −150° C., −120° C., −100° C., or −50° C. and/or up to −10° C., 0° C., 10° C., 20° C., 30° C., 40° C., 50° C., or 70° C.). The hydroxy-functional hydrophobic polymer can be either in a liquid or a rubbery state at common use temperatures of the final coating, for example in a range from 10° C. to 40° C. or 20° C. to 30° C. In various embodiments, the hydroxy-functional hydrophobic polymer is a liquid at a temperature in a range from 10° C. to 40° C. (e.g., from 20° C. to 30° C., or about room temperature, such as where the hydroxy-functional hydrophobic polymer has a melting temperature ($T_m$) below 10° C. or 20° C.). The hydroxy groups can be terminal and/or pendant from the hydrophobic polymer. In an embodiment, the hydroxy groups are terminal groups on a hydrophobic polymer (e.g., linear hydrophobic polymer with one or two terminal hydroxy groups). The second backbone segments B2 can result from a single hydroxy-functional hydrophobic polymer species or a blend of two or more different hydroxy-functional hydrophobic polymer species with the same or different degree of hydroxy functionality. The hydroxy-functional hydrophobic polymers can generally include one or more of hydroxy-functional polysiloxanes, hydroxy-functional polyperfluoroethers, hydroxy-functional polybutadienes, hydroxy-functional poly(ethylene glycol) methyl ether ("PEO"), hydroxy-functional polyisobutylene ("PIB"), hydroxy-functional branched polyolefins, hydroxy-functional polyacrylates and polymethacrylates (e.g., also including $C_2$-$C_{16}$ pendant alkyl groups), and any other hydrophobic polymer with a glass transition temperature of 50° C. or less. In an embodiment, the hydroxy-functional hydrophobic polymers, the second backbone segments B2, and/or the corresponding omniphobic composition can be free from fluorine or fluorinated components (e.g., not using hydroxy-functional polyperfluoroethers or other fluorine-containing components during synthesis).

The third backbone segments B3 have a structure corresponding to a urethane reaction product from at least one polyol (e.g., diol, triol, or higher degree of hydroxyl functionality) and a polyisocyanate. The third backbone segments B3 can result from a single polyol species or a blend of two or more different polyol species with the same or different degree of hydroxyl functionality.

The first urethane (or carbamate) groups L1 have a structure corresponding to a urethane reaction product of the polyisocyanate and the polyol, and the first urethane (or carbamate) groups L2 have a structure corresponding to a urethane reaction product of the polyisocyanate and the hydroxy-functional hydrophobic polymer.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof. The polyisocyanate can be biobased or made of synthetic feedstock. Examples of suitable biobased polyisocyanates include pentamethylene diisocyanate trimer, and polyisocyanates formed from base compounds to which isocyanate groups are attached (e.g., via suitable derivatization techniques), including isocyanate-terminated poly(lactid acid) having two or more isocyanate groups, isocyanate-terminated poly(hydroxyalkanaotes) having two or more isocyanate groups, isocyanate-terminated biobased polyesters having two or more isocyanate groups.

The hydroxy-functional hydrophobic polymer is not particularly limited and generally can include any hydrophobic polymer with a glass transition temperature of 50° C. or less or 70° C. or less, such as in a range from −150° C. to 50° C. or −150° C. to 70° C. Examples of general classes of hydroxy-functional hydrophobic polymers include hydroxy-functional, hydroxy-functional polyperfluoroethers, hydroxy-functional polybutadienes, hydroxy-functional polyolefins (e.g., polyethylene, polypropylene, polybutylene), and combinations or mixtures thereof. The hydroxy-functional polyperfluoroether (e.g., hydroxy-functional polyperfluoropolyethers) can include mono-, di-, or higher hydroxy functional polyperfluoroethers, or a blend of thereof, such as a blend of mono- and dihydroxy-functional polyperfluorothers. The hydroxy-functional polybutadiene can include mono-, di-, or higher hydroxy functional polybutadienes, or a blend of thereof, such as a blend mono- and dihydroxy-functional polybutadienes. Many suitable hydroxy-functional hydrophobic polymers are commercially available (e.g., hydroxy-functional PDMS with a variety of available degrees of functionality and molecular weights). Hydrophobic polymers that are not commercially available in their hydroxy-functional form can be hydroxy functionalized using conventional chemical synthesis techniques.

The hydroxy-functional polysiloxane is not particularly limited and generally can include any polysiloxane having mono-, di-, or higher hydroxy functionality. In some embodiments, the hydroxy-functional polysiloxane includes a monohydroxy-functional polysiloxane. In some embodiments, the hydroxy-functional polysiloxane includes a dihydroxy-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The hydroxy groups are suitably terminal hydroxy groups, for example in a polydialklylsiloxane represented by HO—$R_3$—[Si($R_1R_2$)—O]$_x$—$R_3$—OH for a dihydoxy compound or HO—$R_3$—[Si($R_1R_2$)—O]$_x$—$R_3$ for a monohydoxy compound, where $R_3$ independently can be H (when a terminal group) or $C_1$-$C_{12}$ linear or branched alkyl (when a terminal group or a linker for a terminal hydroxy group). The hydroxy groups additionally can be pendant hydroxy groups, for example in a polydialklylsiloxane represented by $R_3$—[Si($R_1R_2$)—O]$_x$—[Si($R_{1'}R_{2'}$)—O]$_y$—$R_3$, where $R_{1'}$ and $R_{2'}$ independently can be the same as $R_1$ and $R_2$, but at least one or both of $R_{1'}$ and $R_{2'}$ independently is a $C_1$-$C_{12}$ linear or branched alkyl linker group with a terminal hydroxy group (e.g., —OH). Some examples of polyslioxanes with hydroxy group(s) include hydroxy-bearing polydimethylsiloxane, hydroxy-bearing polymethylphenylsiloxane, and hydroxy-bearing polydiphenylsiloxane. In some embodiments, fluorinated analogs or derivatives of the foregoing hydroxy-functional polysiloxanes can be used. For example, fluorinated siloxanes with perfluoro groups (e.g., —$CF_3$, —$CF_2CF_3$, —$CF_2CF_2CF_3$) attached to an Si—O backbone can be used.

Some examples of polyperfluoropolyethers with hydroxy group(s) include hydroxy-bearing poly(n-hexafluoropropylene oxide) (—($CF_2CF_2CF_2O$)n-)OH) and hydroxy-bearing poly(hexafluoroisopropylene oxide) (—($CF(CF_3)CF_2O$)n OH or PFPO—OH). Some examples of hydroxy-bearing atactic polyolefins include hydroxy-bearing poly(1-butene), branched polyethylene, poly(cis-isoprene), poly(trans-isoprene), and poly (1-octene). Some examples of hydroxy-bearing polyacrylates include poly(3-hydroxy propyl acrylate). Similarly, mono-functional hydroxy-bearing polymers include monohydroxy polyisobutylene (PIB-OH), monohydroxy polypolyethylene glycol (PEG-OH), monohydroxy poly(1-butene) (PB-OH, cis and trans) can also be used as the low-glass transition temperature ($T_g$ less than 50° C.) polymers, either alone or in combination with other hydroxy-functional hydrophobic polymers.

The hydroxy-functional hydrophobic polymer can have any suitable molecular weight in view of desired glass transition temperature, for example having a molecular weight ranging from 300 to 50,000 g/mol. In various embodiment, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Some embodiments can include a blend of two or more hydroxy-functional hydrophobic polymers with different average molecular weights, such as one with 300-1500 g/mol and another with 1500-50,000 g/mol with a higher average molecular weight than the first. Blends of hydroxy-functional hydrophobic polymers (e.g., differing in molecular weight and/or in degree of functionality) can improve the combination of water- and oil-repellency properties of the final composition. For example, a monohydroxy-functional polysiloxane can provide better water and oil repellency than a dihydroxy-functional polysiloxane. Low MW hydroxy-functional polysiloxanes (e.g., PDMS, such as having a MW range of about 800-1200 g/mol or an average MW of about 1000 g/mol) can provide an improved water repellency, while Higher MW hydroxy-functional polysiloxanes (e.g., PDMS, such as about 2000 g/mol or above for an average or range of MW) can provide an improved oil repellency.

The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols (e.g., polypropylene oxide-based triols such as commercially available MULTRANOL 4011 with a MW of about 300), triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols (e.g., having random, block, and/or alternating hydroxyl functionalities along with other (meth) acrylic moieties), polyester polyols, and/or polyurethane polyols. The polyol can be biobased or made of synthetic feedstock. Examples of suitable biobased polyols include isosorbide, poly(lactic acid) having two or more hydroxyl groups, poly(hydroxyalkanaotes) having two or more hydroxyl groups, and biobased poly(esters) having two or more hydroxyl groups (e.g., as terminal groups).

In some embodiments, at least one of the polyisocyanate and the polyol is a tri- or higher functional isocyanate or alcohol/hydroxy compound, respectively, to promote crosslinking of the backbone segments in the final thermoset polymer. Alternatively or additionally, in some embodiments, the hydroxy-functional hydrophobic polymer is a tri- or higher hydroxy-functional compound (e.g., tri-functional hydroxy PDMS) so that the hydrophobic polymer can serve as a crosslinker, either alone or in combination with polyisocyanate and/or polyol crosslinkers.

The first, second, and third backbone segments can be incorporated into the thermoset polymer in a variety of relative weight amounts. In an embodiment, the first backbone segments are present in an amount ranging from 10 wt. % to 90 wt. % relative to the thermoset polymer (e.g., at least 10, 15, or 20 wt. % and/or up to 30, 40, 50, 60, 70, 80, or 90 wt. %; such as 30 wt. % to 70 wt. %), which amounts can equivalently correspond to the polyisocyanate(s), for example as added to a reaction mixture and relative to all monomeric, oligomeric, and polymeric reaction components added thereto. In an embodiment, the second backbone segments are present in an amount ranging from 0.01 wt. % to 20 wt. % relative to the thermoset polymer (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %), which amounts can equivalently correspond to the hydroxy-functional hydrophobic polymer(s), for example as added to a reaction mixture and relative to all monomeric, oligomeric, and polymeric reaction components added thereto. In an embodiment, the third backbone segments are present in an amount ranging from 10 wt. % to 90 wt. % relative to the thermoset polymer (e.g., at least 10, 20, 30, 40, or 50 wt. % and/or up to 70, 80, or 90 wt. %, such as 30 wt. % to 70 wt. %), which amounts can equivalently correspond to the polyol monomer(s), for example as added to a reaction mixture and relative to all monomeric, oligomeric, and polymeric reaction components added thereto.

Similarly, the first, second, and third backbone segments can be incorporated into the thermoset polymer in a variety of relative molar amounts based on the corresponding reactive functional groups of their corresponding monomeric, oligomeric, and polymeric reaction components. Suitably, approximately a 1:1 molar ratio of combined hydroxy functional groups (from the polyol(s) and hydroxy-functional hydrophobic polymer(s), respectively) relative to isocyanate groups (from the polyisocyanate(s)) is used when combining reactive components to make the omniphobic composition. In most cases, isocyanate groups are added in a slight molar excess. Final molar ratios of (i) isocyanate groups to (ii) hydroxy groups combined are typically between 1:1 to 1.6:1, for example at least 1:1, 1.1:1, or 1.2:1 and/or up to 1.4:1, 1.5:1, or 1.6:1.

In an embodiment, the thermoset polymer crosslinked backbone can include further types of backbone segments. For example, the backbone can include fourth backbone segments which have a structure corresponding to a urethane reaction product of at least one monoisocyanate (e.g., when a monoisocyanate is included with the polyisocyanate and the other reaction components forming the omniphobic composition). The monoisocyanate can be a reactive monomer with only one isocyanate reactive group, which can be used as a means to control crosslinking degree as well as to incorporate hydrophobic or other functional groups at an external or boundary portion of the thermoset polymer. Examples of monoisocyanates include R—(N=C=O), where R can include aromatic, alicyclic, and/or aliphatic groups, for example having at least 2, 4, 6, 8, 10 or 12 and/or up to 8, 12, 16, or 20 carbon atoms. The fourth backbone segments can be present in an amount ranging from 0.01 wt. % to 4 wt. % relative to the thermoset polymer (e.g., at least 0.01, 0.1, 0.2, or 0.5 wt. % and/or up to 1, 2, or 4 wt. %), which amounts can equivalently correspond to the monoisocyanate monomer, for example as added to a reaction mixture and relative to all monomeric, oligomeric, and polymeric reaction components added thereto.

In an embodiment, the omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, silicon dioxide (silica), aluminum oxide, silsesquioxanes (e.g., polyoctahedral silsesquioxanes; "POSS"), diatomaceous earth, cellulose nanocrystals, carbon nanotubes, titanium dioxide (titania), and combinations or mixtures thereof. In addition, the fillers can include biocides, pigments, dyes, a thermoplastic material, UV inhibitors, electrostatic charge-dissipating compounds, polysorbates, sorbitan esters, unreactive lubricants, or a combination thereof. The fillers can be added in the range from 0.01 wt. % to 10 wt. %, for example in range from 1 wt. % to 5 wt. %. The presence of organic or inorganic fillers in the omniphobic composition can affect the clarity of the resulting composition, in which case the amount and size of the fillers can be selected in view of the desired clarity properties of the composition as well as the mechanical, electrical, omniphobic or other functional properties of the final composition. These fillers can form chemical bonds with urethane matrix and/or interact via secondary forces.

The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 10 µl or 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

Figure 4:
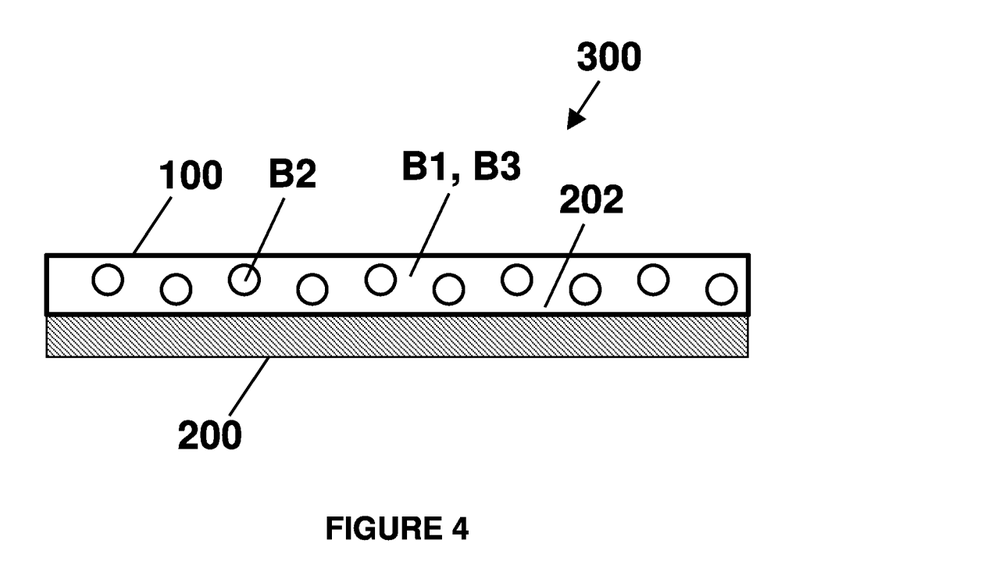
FIG. 4 illustrates a coated article according to the disclosure in which the thermoset omniphobic composition has a composite structure.

In an embodiment, the thermoset omniphobic composition has a composite structure as illustrated in FIG. 4. The composite structure can include a solid matrix formed primarily from the first backbone segments and the third backbone segments linked together (e.g., with or without some second backbone segments incorporated therein). The composite structure can further include nanodomains distributed throughout the solid matrix. The nanodomains are formed primarily from the second backbone segments (e.g., with or without minor amounts of first and/or third backbone segments incorporated therein), and generally have a size of 80 nm or less, more preferably 40 nm or less. The nanodomains can be liquid nanodomains or rubbery nanodomains, depending on the usage temperature of the omniphobic composition relative to the glass transition and melting temperatures of the hydroxy-functional hydrophobic polymer precursor to the second backbone segments. For example, the nanodomains can have a size or diameter of at least 0.1, 1, 10, 15 or 20 nm and/or up to 30, 40, 50, or 80 nm; for example 1 nm to 40 nm or 1 nm to 80 nm. The ranges can represent a distribution of sizes for the nanodomains and/or a range for an average nanodomain size (e.g., weight-, number-, or volume-average size). In a lower limit as the size of the nanodomains approaches zero, the composition approaches a homogeneous structure as a homogeneous thermoset solid with the first, second, and third backbone segments being generally evenly distributed throughout the omniphobic composition as illustrated in FIG. 5.

Coated Article

Figure 5:
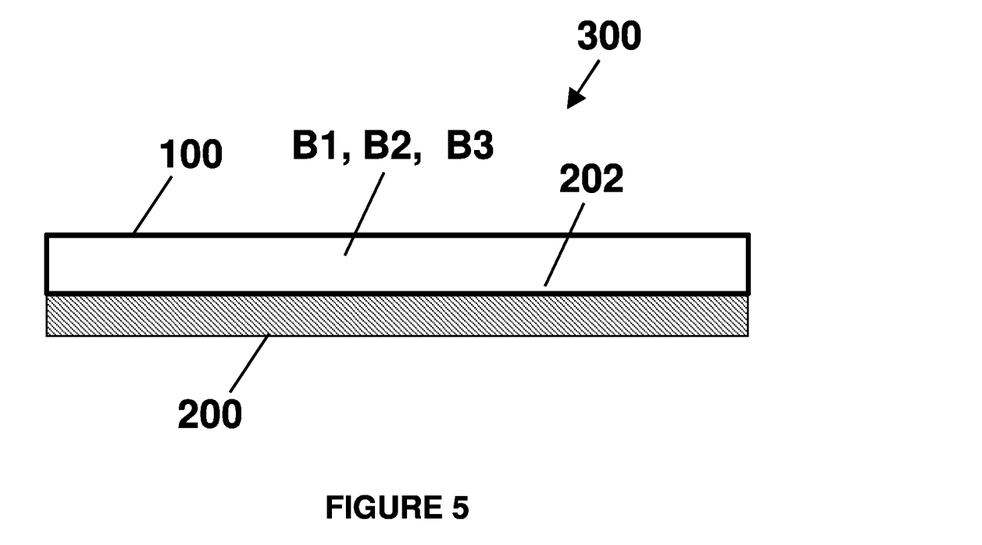
FIG. 5 illustrates a coated article according to the disclosure in which the thermoset omniphobic composition has a homogeneous structure.

FIGS. 4 and 5 illustrate an aspect of the disclosure in which a coated article 300 (e.g., desirably having omniphobic properties on at least one surface thereof) includes a substrate 200 and the thermoset omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the thermoset omniphobic composition 100 provides omniphobic protection to the underlying substrate 200.

The substrate 200 is not particularly limited, and generally can be formed from any material desired for protection with an omniphobic coating, in particular given the good, broad adhesive capabilities of the thermoset omniphobic composition 100. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), polylactic acid (PLA), starch, chitosan, etc. In an embodiment, the substrate can be in the form of a three-dimensionally printed substrate, whether formed from a polymeric/plastic material or otherwise. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the thermoset omniphobic composition 100 on the one or more intermediate coatings as the final, external coating on the coated article 300.

The thermoset omniphobic composition 100 can have any desired thickness on the substrate 200. In common applications, the composition 100 has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate 200 to form even thicker layers of the composition 100 (e.g., above 500 µm or otherwise) if desired.

Method of Making Composition and Coated Article

The thermoset omniphobic composition according to the disclosure generally can be formed by first reacting the polyisocyanate(s), the hydroxy-functional hydrophobic polymer(s), and the polyol(s) to form a partially crosslinked (e.g., not fully crosslinked) reaction product, and then curing the partially crosslinked reaction product to form the thermoset omniphobic composition (e.g., after application a substrate to provide an omniphobic coating thereon). The partially crosslinked reaction product contains at least some unreacted isocyanate and hydroxy groups for eventual further reaction during curing/full crosslinking. In some embodiments, the partially crosslinked reaction product contain at least some unreacted isocyanate and polyol hydroxy groups, but is free or substantially free of unreacted hydroxy groups from the hydroxy-functional hydrophobic polymer (e.g., where all or substantially all of the hydroxy groups in the hydroxy-functional hydrophobic polymer have reacted with an isocyanate group, but the polyisocyanates still have at least some free some unreacted isocyanate groups remaining). The initial, partial crosslinking reaction can be performed in a suitable reaction solvent or medium, for example an aprotic organic solvent such as acetone, tetrahydrofuran, 2-butanone, other ketones (e.g., methyl n-propyl ketone, methyl isobutyl ketone, methyl ethyl ketone, ethyl n-amyl ketone), esters (e.g., $C_1$-$C_4$ alkyl esters of $C_1$-$C_4$ carboxylic acids, such as methyl, ethyl, n-propyl, butyl esters of acetic acid such as n-butyl acetate, etc., n-butyl propionate, ethyl 3-ethoxy propionate), dimethylformamide, dimethyl carbonate, etc. In some cases, a mixture of two or more solvents can be used for the initial, partial crosslinking reaction. In some embodiments, a reaction catalyst is added to catalyze the reaction between the polyisocyanate and the polyol and/or the hydroxy-functional hydrophobic polymer. Various commercial and laboratory-synthesized catalysts can be used, for example including, but not limited to, complexes and/or salts of tin (e.g., tin(II) 2-ethylhexanoate) or iron, and tertiary amines (e.g., triethylamine), 1,8-Diazabicyclo[5.4.0]undec-7-ene (DBU) and 1,4-Diazabicyclo[2.2.2]octane (DABCO). Curing can be performed by heating (e.g., in an oven, with exposure to a heat lamp, etc.) at a temperature from 80° C. or 100° C. to 120° C., 140° C., or 180° C. and/or for a time from 1 hr to 24 hr. Lower heating temperature or ambient temperature curing also possible, such as room temperature curing (e.g., 20° C. to 30° C.) for 4 hr-240 hr or 5-10 days (e.g., at least 4, 8, 12, 16, or 24 hr and/or up to 12, 16, 24, 48, 72, 96, 120, or 240 hr), lower heating (e.g., 30° C. or 40° C. to 60° C. for 4 hr-96 hr or 2-4 days or 60° C. to 80° C. for 1 hr-72 hr or 1-3 days).

Reaction to form the partially crosslinked reaction product generally can be performed at any suitable reaction temperature(s) and time(s), which can be selected such that there is sufficient time to partially (but not completely) crosslink/cure the components of the reaction mixture, thus leaving some reactive functional groups for eventual full curing/crosslinking in the final thermoset composition. In an embodiment, reaction to form the partially crosslinked reaction product is performed (i) at temperature from 20° C. or 40° C. to 80° C. or 100° C. and (ii) for a time from 5 min to 300 min or 1000 min. Thus, reaction can be performed with or without heating the reaction mixture. Room-temperature (e.g., 20° C. to 30° C.) reactions are possible with longer reaction times and/or the addition of a catalyst. Reaction between the polyisocyanate and the polyol and/or the hydroxy-functional hydrophobic polymer can be slower and preferably involves heating and/or the use of a catalyst.

In an embodiment, reaction to form the partially crosslinked reaction product includes stirring or otherwise mixing the reaction components to improve reactant homogeneity and that of the eventual product. Mixing or stirring during the reaction between the polyisocyanate and the hydrophobic polymer (e.g., whether the two are reacted/combined separately from or together with the polyol) is particularly desirable to help form a distributed partially cured reaction product in which most polyisocyanate molecules have at least one free isocyanate functional group for eventual reaction with a polyol molecule. Put another way, stirring/mixing helps to avoid a situation in which some polyisocyanate molecules have all of their isocyanate groups reacted with hydroxy groups from the hydroxy-functional hydrophobic polymer, which in turn prevents further reaction with a polyol molecule for incorporation into the crosslinked network of the thermoset polymer and can lead to opaque or hazy films (i.e., instead of desirably transparent films). Accordingly, mixing/stirring combined with appropriate selection of stoichiometric ratios between the polyisocyanate, the hydroxy-functional hydrophobic polymer, and the polyol helps to ensure that most, if not all or substantially all, polyisocyanate molecules react with at least one polyol molecule (e.g., having at least one urethane link).

In an embodiment, reaction to form the partially crosslinked reaction product includes first reacting the polyisocyanate and the hydroxy-functional hydrophobic polymer (e.g., in the absence of the polyol) to form an initial reaction product. Reaction to form the initial reaction product is preferably performed with mixing or stirring as above to obtain a good distribution of unreacted polyisocyanate molecules and/or partially hydroxy-reacted polyisocyanate molecules with at least one isocyanate group available for further reaction. The initial reaction product suitably contains hydroxy-reacted polyisocyanate molecules as well as possibly one or both of unreacted polyisocyanate molecules and unreacted hydroxy-functional hydrophobic polymers. This step can be performed in a single reaction vessel prior to addition of the at least one polyol, and is preferably performed in the absence of any other reactive hydroxyl-containing species, whether polyol or otherwise. The initial reaction product is then reacted with the polyol to form partially crosslinked reaction product, for example by adding or otherwise combining the polyol with the initial reaction product between the polyisocyanate and the hydroxy-functional hydrophobic polymer (e.g., in the same reaction vessel, and optionally with heating and/or further catalyst addition). This sequence of addition/reaction is preferable but required. Other sequences of addition or combination of all three reactive components at the same time are possible. In some cases, the resulting thermoset omniphobic composition might have relatively poorer optical properties in terms of being partially opaque or not completely transparent, but the composition generally has the same or comparable omniphobic properties with respect to contact and gliding angles, etc.

In an embodiment, curing the partially crosslinked reaction product includes adding a casting solvent to the partially crosslinked reaction product. Suitably, the casting solvent is one that does not dissolve the hydroxy-functional hydrophobic polymer, which is a suitable selection whether the final thermoset composition is desired to have an inhomogeneous composite-type structure with nanodomains as described above or a homogeneous structure Examples of suitable casting solvents include dimethyl carbonate, diethyl carbonate, dimethylformamide, dimethylacetamide, acetonitrile, etc. Further, it can be desirable to remove the reaction solvent used for form partially crosslinked reaction product, for example by heating and/or using a gas such as nitrogen (e.g., purging or bubbling the gas through the reaction mixture), so that the partially crosslinked reaction product is in solution in the casting solvent. The casting solvent and the partially crosslinked reaction product are then applied to a substrate, which is subsequently air-dried to remove the casting solvent and form a coating of the partially crosslinked reaction product on the substrate. The dried coating is then cured as described above to form the thermoset omniphobic composition coating on the substrate. In most cases, the cured thermoset remains as a coating on the substrate to provide omniphobic properties to the substrate. In some embodiments, the cured thermoset can be deliberately peeled or otherwise removed from the substrate to provide a standalone composition in the form or a free film or other coating. The coating can be applied using any suitable method, such as by casting, spraying, rolling and/or dipping.

In an embodiment, curing the partially crosslinked reaction product includes applying the partially crosslinked reaction product to a substrate (e.g., applied as dissolved/dispersed in its original reaction medium or reaction solvent, without solvent exchange/addition with a casting solvent). The coated substrate is then dried (e.g., to remove the reaction solvent) to form a coating of the partially crosslinked reaction product on the substrate. The dried coating is then cured as described above to form the thermoset omniphobic composition coating on the substrate.

EXAMPLES

The following examples illustrate the disclosed compositions and methods, but are not intended to limit the scope of any claims thereto. In the following examples, thermoset omniphobic compositions generally according to the disclosure are prepared and applied as a film or coating on a test substrate such as glass. The applied films or coatings can then be evaluated according to a variety of tests as described below in order to characterize their relative degree of omniphobicity.

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 0° or 1° to 65° (e.g., at least 1°, 10°, 20°, or 30° and/or up to 40°, 50°, 60°, or 65°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 10 µl or 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance: Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Permanent Ink Resistance: Permanent ink resistance is evaluated on a scale of 1 (worst) to 10 (best) by applying an ink marking on a test coating surface using a permanent ink marker (e.g., SHARPIE permanent ink marker or equivalent) and then attempting to wipe off the marking using a tissue (e.g., KIMWIPE laboratory cleaning tissue or equivalent). The test surface is rated as "1" if all of the ink marking remains on the test coating surface after being wiped. The test surface is rated as "10" if all of the ink marking is removed from the test coating surface after being wiped. These numbers give an estimation of the ink-resistance, which are qualitatively assigned by taking two aspects in consideration: 1) the amount of ink left behind after a single wipe of the sample, and 2) the ink left behind after multiple wipes of the sample.

Example 1—Omniphobic Polyurethane Compositions

Thermoset omniphobic compositions according to the disclosure were formed as described below, cast onto a test slide, and then evaluated for omniphobic properties. Specifically, the cast film was characterized according to the following properties: (A) Omniphobicity ("good" indicating that water, oil, and hexadecane slides from the film without leaving any trail or tail), (B) Permanent Ink Resistance (scale of 1-10, where 10 is the best); (C) Appearance/Clarity (scale of 1-10, where 10 is the best/transparent film); and (D) Scratch Resistance (scale of 1-10, where 10 is best/excellent).

Sample 1: 0.2 ml UH80 (hexamethylene diisocyanate (HDI) trimer biuret) and 15 mg of DMS-C21 (PDMS-Diol, Mw: 5000 g/mol, GELEST), US3 (0.5 ml) reducer solvent mixture (2-butanone, 2-pentanone, ethoxy propionate, and n-butyl acetate), and 5 mg of catalyst (tin(II) ethyl hexanoate) were mixed and stirred for 4 h. Now add 1 ml polyol CC939 (acrylic polyol), and stir for 3 h. Then add the remaining 3 ml CC939 and 0.8 ml UH80. Now add dimethyl carbonate (1 ml) and stir for 1-60 min before casting. The samples were cured at ambient conditions. Performance: clarity: 10; scratch resistance: 10; ink-resistance: 10; omniphobicity: good.

Sample 2: 0.2 ml UH80 and 15 mg of DMS-C21 (PDMS-Diol, Mw: 5000 g/mol, GELEST), US3 (0.5 ml), and 5 mg of catalyst were mixed and stirred for 4 h. Now add polyol CC939 (1 ml), and stir for 3 h. Then add the remaining 3 ml CC939 and 0.8 ml UH80. Now add dimethyl carbonate (0.5 ml) and stir for 1-60 min before cast. The samples were cured at ambient conditions. Performance: clarity: 10; scratch resistance: 10; ink-resistance: 10; omniphobicity: good.

Sample 3: 0.2 ml UH80 and 15 mg of DMS-C21 (PDMS-Diol, Mw: 5000 g/mol, GELEST), US3 (1 ml) and 5 mg of catalyst were mixed and stirred for 4 h. Now add polyol CC939 (1 ml), and stir for 3 h. Then add the remaining 3 ml CC939 and 0.8 ml UH80. Now add dimethyl carbonate (1 ml) and stir for 1-60 min before cast. The samples were cured at ambient conditions. Performance: clarity: 10; scratch resistance: 10; ink-resistance: 10; omniphobicity: good.

Sample 4: 0.2 ml UH80 and 15 mg of DMS-C21 (PDMS-Diol, Mw: 5000 g/mol, GELEST), US3 (1 ml) and 5 mg of catalyst were mixed and stirred for 4 h. Now add polyol CC939 (1 ml), and stir for 3 h. Then add the remaining 3 ml CC939 and 0.8 ml UH80. Now add dimethyl carbonate (0.5 ml) and stir for 1-60 min before cast. The samples were cured at ambient conditions. Performance: clarity: 10; scratch resistance: 10; ink-resistance: 10; omniphobicity: good.

Sample 5: 0.07 ml UH80, 30 mg of DMS-C16 (PDMS-Diol; Mw: 600-800 g/mol), and US3 (1 ml) were mixed and stirred for 6 h. Now add 4 ml polyol CC939. Stir overnight. Then add 0.93 ml of UH80. Stir the combination until it is well mixed, and then cast the solution on a glass plate. The samples were cured at ambient conditions. Performance: clarity: 10; scratch resistance: 10; ink-resistance: 10; omniphobicity: good.

Sample 6: 0.07 ml UH80, 30 mg of DMS-C15 (PDMS-Diol; Mw: 1000 g/mol), and US3 (1 ml) were mixed and stirred for 6 h. Now add 4 ml polyol CC939. Stir overnight. The add 0.93 ml of UH80. Stir the combination until it is well mixed, and then cast the solution on a glass plate. The samples were cured at ambient conditions. Performance: clarity: 10; scratch resistance: 10; ink-resistance: 10; omniphobicity: good.

Example 2—Omniphobic Polyurethane Compositions

Thermoset omniphobic compositions according to the disclosure were formed as described below, cast onto a test slide, and then evaluated for omniphobic properties. Specifically, the cast film was evaluated for (A) contact and/or sliding angles for water, oil, and/or hexadecane droplets and (B) clarity (expressed as % transmittance through the film).

Master Solution A: Mix 1 ml of UH80 (hexamethylene diisocyanate (HDI) trimer biuret) and 100 mg of PDMS-OH (mono-hydroxy PDMS; 4700 g/mol), and then dilute the mixture with reducer US38 (0.5 ml, US38 is solvent mixture of 2-butanone, butyl acetate and other long chain esters). Then add 1 drop of Tin catalyst. Keep the mixture ("Master Solution A") stirring at room temperature.

Samples 1-3: Sample Preparation: Mix 1 ml of polyol (CC939) and 0.2 ml of reducer US38. Then add 0.3 ml of Master Solution A (stirred for 4 h), and continue stirring. Portions of the sample were cast at different time intervals of mixing after combining all components to evaluate the effect of partial crosslinking time before casting. Sample PU2-1 m was cast after 1 min of combining/stirring, PU2-1 h was cast after 1 hr of combining/stirring, and PU2-4 h was cast after 4 hr of combining/stirring. The cast samples were cured at ambient temperature conditions.

mix all components well by stirring. A portion of the sample was cast after 1 min of combining/stirring, and a portion of the sample was cast after 1 hr of combining/stirring. The cast samples were cured at ambient temperature conditions. The data in Table 2 below are for the films cast after 1 hr of combining/stirring.

TABLE 2

Omniphobic and Clarity Properties for Varying Solvents

| Example/Sample (Solvent) | Water Sliding Angle | Oil Sliding Angle | Hexadecane Sliding Angle | % Transmittance |
|---|---|---|---|---|
| 2.4 (DMC) | 13° | 17° | 19° | 89 |
| 2.5 (Acetonitrile) | 14° | 18° | 19° | 90 |

Example 3—Omniphobic Polyurethane Coatings

Thermoset omniphobic compositions according to the disclosure were formed as described below, cast onto various test substrates, and then evaluated for omniphobic properties and mechanical properties, including tensile properties and abrasion resistance.

Materials: Acetone (Fisher Thermo Scientific), dimethyl carbonate (MilliporeSigma), tetrahydrofuran (Fisher Thermo Scientific), n-butyl acetate (MilliporeSigma), cyclohexanone (MilliporeSigma), acetonitrile (MilliporeSigma), 2-butanone (MilliporeSigma), tin(II)2-ethyl hexanoate (MilliporeSigma) were purchased and used without further modification. Poly (dimethylsiloxane) monohydroxy terminated ($PDMS_{4.6K}$-OH-$M_n$=4670, MilliporeSigma), poly(dimethylsiloxane) di(hydroxyalkyl) terminated ($PDMS_{5.6K}$-bis-OH $M_n$=5600, MilliporeSigma), carbinol (hydroxyl) terminated polydimethylsiloxane ($PDMS_{1.0K}$-bis-OH $M_n$=1000, DMS-C15, Gelest Inc.), carbinol (hydroxyl) terminated polydimethylsiloxane ($PDMS_{0.7K}$-bis-OH, $M_n$=600-850, DMS-C16, Gelest Inc.) was characterized by $^1$H NMR and GPC before use. The polyol CC939 and hexamethylene diisocyanate trimer, (HDIT) were obtained from Sherwin-Williams and mixed according to the manufacturer's instructions.

PDMS-PU coating solution preparation: In a 20 mL glass vial with a magnetic stir bar, HDIT (1.0 mL, 5.7 mmoles of NCO) was added, followed by the addition of dimethyl carbonate (DMC, 2.0 mL). To the above solution, hydroxy-terminated PDMS (PDMS-OH) was added and stirred the solution. After 10 minutes, tin (II) ethylhexanoate catalyst 5.0 mg (dissolved in 0.5 ml of DMC) was added, and the reaction mixture was stirred at room temperature for 1 hour. At this point, polyol (2.0 mL, 2.8 mmol) was added to the

TABLE 1

Omniphobic and Clarity Properties for Varying Partial Crosslinking Time

| Example/Sample | Name | Water Contact | Water Sliding | Oil Contact | Oil Sliding | Hexadecane Contact | Hexadecane Sliding | % T |
|---|---|---|---|---|---|---|---|---|
| 2.1 | PU2-1m | 101° | 14° | 52° | 19° | — | 19° | 88 |
| 2.2 | PU2-1h | 102° | 14° | 52° | 18° | — | 19° | 87 |
| 2.3 | PU2-4h | 102° | 13° | 52° | 18° | 45-47° | 18° | 84 |

Samples 4-5: Mix 1 ml of polyol (CC939) and 0.2 ml of reducer US38. Then add 0.3 ml of Master Solution A (stirred for 4 h) as described above along with 2 mL of either dimethylcarbonte (DMC) or acetonitrile solvent, and then reaction mixture. The reaction mixture was then stirred for another 3 hours. Now the remaining amount of polyol (2.0 mL, 2.8 mmol) was added and stirred for an additional 30 minutes to obtain the resultant PDMS-PU solution ready for casting. Control PU coating solutions were prepared following the foregoing procedure, but without adding the PDMS-OH component.

PDMS-PU coating on different substrates: PDMS-PU coatings were applied to different test substrates, including glass, cotton fabric, wood, and metal. For glass substrates, PDMS-PU coating solution (1.0 mL) was drop casted on a glass slide (2.54 cm×7.62 cm). The samples were left at ambient condition for curing for a period of 24 hours. For cotton fabric substrates, a cotton fabric (7 cm×7 cm) was dipped in PDMS-PU solution (2.0 mL, at 2 wt % of PDMS) for 1 min. Then, the coated cotton fabric was allowed to cure under ambient conditions for 24 hours. For wood substrates, PDMS-PU (1.5 mL, at 2.0 wt % of PDMS) was cast on an oak wood piece (3 cm×5 cm). The coated wood strip was then allowed to cure at room temperature overnight. For metallic substrates, PDMS-PU coating solution (0.3 mL, at 2.0 wt % of PDMS) was drop cast on a steel disc (5.0 cm$^2$). The coated steel disc was then allowed to cure overnight at room temperature.

Characterization: Static contact angles were measured for the PDMS-PU coatings using a goniometer (Rame-Hart Co., 100-25A) according to the general procedure described above. Three liquids were used to determine their static contact angles including deionized water (50.0 µL), hexadecane (10.0 µL), and cooking oil (canola, 5.0 µL). For the receding and advancing angles, the liquid (water, hexadecane, canola oil) droplets were placed on the coating, and the surface was then gradually tilted. When the droplet starts moving, the image of the droplet was taken and then angles at the front (advancing angle) and at the back (receding angles) were measured. Sliding angles were measured for the PDMS-PU coatings using a tensile testing machine (MTS Systems Corp., T5001) was used to determine the sliding angles using deionized water (50 µL), canola oil (5 µL) and hexadecane (10 µL). Optical transmittance values were measured for the PDMS-PU coatings using a UV-Vis spectrometer (Perkin Elmer, Lambda 25). Percent optical transmittance (% T) of the PDMS-PU coated samples were evaluated in the range of 350-800 nm using an uncoated glass slide as a reference cell.

Figure 6:
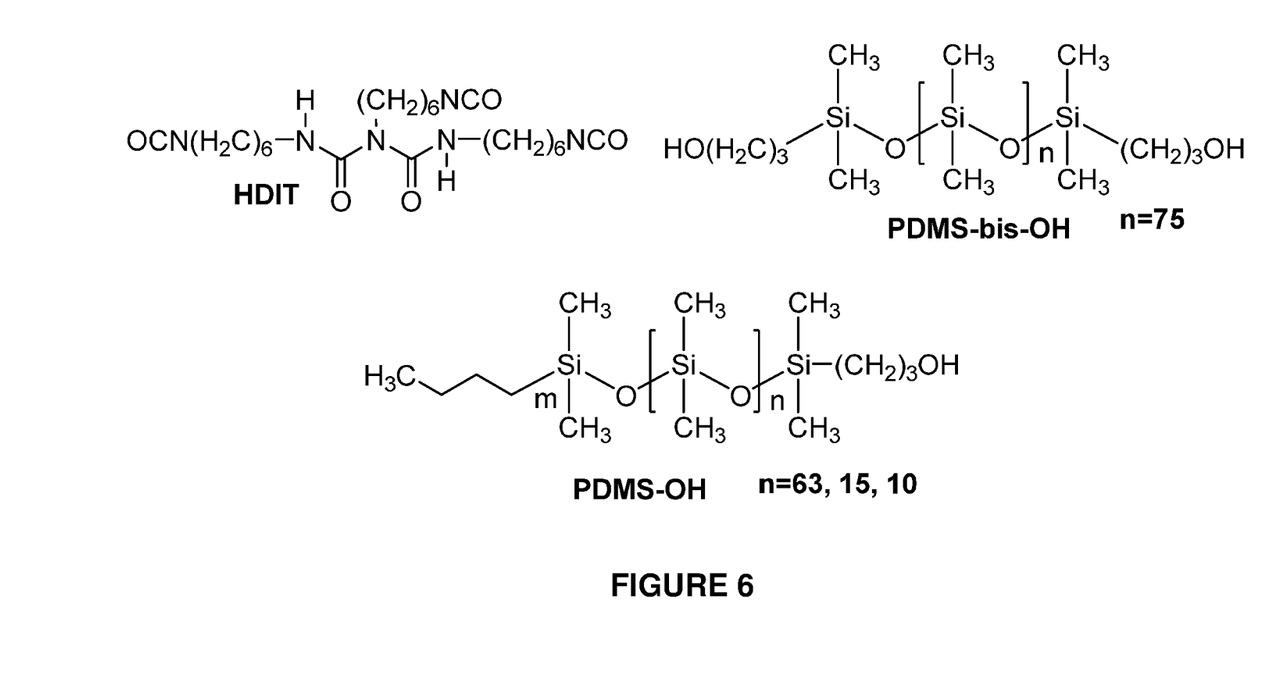
FIG. 6 illustrates chemical structures of components used to form a thermoset omniphobic composition according to the disclosure.

Results: omniphobic PDMS-PU coatings were prepared using a trifunctional polyisocyanate (HDIT) with a monohydroxy-functional PDMS ("PDMS-OH") or a dihydroxy-functional PDMS ("PDMS-bis-OH") of varying molecular weights. Chemical structures for the components are shown in FIG. 6. The hydroxyl group of the hydroxy-functional PDMS was chosen because of its efficient reaction with the —NCO group to ensure successful attachment of PDMS to the PU matrix via a urethane bond; thus the end coating is a 100% PU. Also, PDMS is chemically grafted to the PU matrix that imparts robust omniphobic properties against abrasion. PDMS-OH and PDMS-bis-OH were added into the PU formulations in the presence of a tin II catalyst. The amount of PDMS used in the PU formulations was also varied. PDMS-bis-OH (Mn=5600 g/mol) showed the best performance regarding omniphobicity and transparency (Samples 3.2 and 3.3 in Table 3). PDMS-OH also had good repellency against water, oil, and hexadecane, but had relatively lower optical clarity (% T). It is believed that PDMS-bis-OH showed better clarity relative to PDMS-OH because both ends of the polymer chain could be grafted to the PU matrix providing better kinetically trapped miscibility. Among the PDMS-bis-OH polymers evaluated, higher molecular weight PDMS showed better repellency omniphobic properties than low molecular weight PDMS. The results are summarized in Table 3 below.

TABLE 3

PU Properties with Different Hydroxy-Terminated PDMS

| Example/Sample | PDMS | Water Sliding Angle | Oil Sliding Angle | Hexadecane Sliding Angle | % T |
|---|---|---|---|---|---|
| 3.1 | No PDMS added (control) | * | * | * | 100 |
| 3.2 | PDMS$_{5.6K}$-bis-OH (0.8 wt %) | 13 ± 1 | 18 ± 1 | 15 ± 1 | 100 |
| 3.3 | PDMS$_{5.6K}$-bis-OH (0.5 wt %) | 18 ± 1 | 20 ± 1 | 17 ± 1 | 100 |
| 3.4 | PDMS$_{1.0K}$-bis-OH (0.8 wt %) | 32 ± 1 | 28 ± 1 | 18 ± 1 | 97 ± 1 |
| 3.5 | PDMS$_{1.0K}$-bis-OH (0.5 wt %) | 28 ± 1 | 29 ± 1 | 17 ± 1 | 98 ± 1 |
| 3.6 | PDMS$_{0.7K}$-bis-OH (0.8 wt %) | 29 ± 1 | 32 ± 1 | 16 ± 1 | 99 ± 1 |
| 3.7 | PDMS$_{0.7K}$-bis-OH (0.5 wt %) | 28 ± 1 | 30 ± 1 | 15 ± 1 | 99 ± 1 |
| 3.8 | PDMS$_{4.6K}$-OH (0.8 wt %) | 14 ± 1 | 18 ± 1 | 15 ± 1 | 80 ± 1 |
| 3.9 | PDMS$_{4.6K}$-OH (0.5 wt %) | 14 ± 1 | 17 ± 1 | 15 ± 1 | 86 ± 1 |

Notes:
Water (50 µL), oil (10 µL), and hexadecane (5 µL) were used for the sliding tests. Reference cell for % T was a regular uncoated glass slide. Film thickness 160 µm. Control sample 3.1 ("*") is PU coated glass without PDMS, where water, oil and hexadecane sliding leaves trail.

Two mixing procedures were used for the preparation of PDMS-PU coating solution preparation. A first procedure (route 1) involved the mixing of all ingredients (PDMS-OH, HDIT, polyol, and catalyst) and subsequent stirring for 3 h. The obtained films by route 1 showed inferior clarity (97%). It is believed that this was due to the presence of polyol that provide most of the OH groups to react with NCO during the pre-casting stirring, thus leaving some PDMS-OH and polyol unreacted in the PDMS-PU coating solution. After casting, the unreacted PDMS-OH phase separates from the PU matrix, thus imparting haziness in the PU films. A second procedure (route 2) involved the mixing PDMS-bis-OH and HDIT for an hour to ensure that essentially all OH of the PDMS groups had reacted with the NCO of the HDIT. Then, polyol was added and stirred for 3 h to facilitate bonding between PDMS-urethane-HDIT and polyol. The attachment of polar polyol to PDMS-urethane-HDIT makes PDMS more compatible with the polar PU matrix. As a result, clear PDMS-PU coatings were obtained via route 2. All samples were cured at room temperature (about 22° C.) for overnight. The curing process was monitored by FTIR analysis following the disappearance of the NCO peak.

The effect of different casting solvents on the performance of the PDMS-PU coatings was evaluated. In this regard, PDMS-PU coating solutions were cast from a variety of solvents including dimethylcarbonate (DMC), acetone, tetrahydrofuran (THF), 2-butanone, acetonitrile, butyl acetate, a mixture of butyl acetates (US3), and cyclohexanone. PDMS-PU coatings were prepared by adding PDMS$_{5.6K}$-bis-OH at 2 wt % (samples 3.11-3.18) and one control PU without PDMS was prepared (sample 3.10). The PDMS-PU coatings were prepared in the presence of catalyst (Tin II), and the outcome was objectivly analyzed by recording % T as well as water-, oil- and hexadecane-sliding angles. In the presence of the Tin II catalyst, all solvents except tetrahydrofuran yielded clear films with good omniphobic properties. With Tin II catalyst, DMC-based films offered better properties relative to other solvents (sample 3.15). The results are summarized in Table 4 below.

TABLE 4

Effect of Solvent for Preparation of PDMS-PU Coatings.

| Example/Sample | Solvent | Tin II (mg) | % T | Water Sliding angle (°) | Oil sliding angle (°) | Hexadecane Sliding angle (°) |
|---|---|---|---|---|---|---|
| 3.10 | PU without PDMS (Control) | 5.0 | 100 | * | * | * |
| 3.11 | Acetonitrile | 5.0 | 99 ± 1 | 17 ± 1 | 21 ± 1 | 16 ± 1 |
| 3.12 | THF | 5.0 | 40 ± 1 | 15 ± 1 | 20 ± 1 | 15 ± 1 |
| 3.13 | 2-Butanone | 5.0 | 97 ± 1 | 20 ± 1 | 18 ± 1 | 15 ± 1 |
| 3.14 | Acetone | 5.0 | 93 ± 1 | 14 ± 1 | 17 ± 1 | 14 ± 1 |
| 3.15 | DMC | 5.0 | 99 ± 1 | 13 ± 1 | 17 ± 1 | 14 ± 1 |
| 3.16 | US3 | 5.0 | 96 ± 1 | 17 ± 1 | 21 ± 1 | 16 ± 1 |
| 3.17 | Butyl Acetate | 5.0 | 94 ± 1 | 14 ± 1 | 18 ± 1 | 15 ± 1 |
| 3.189 | Cyclohexanone | 5.0 | 99 ± 1 | 18 ± 1 | 22 ± 1 | 15 ± 1 |

Notes:
Water (50 µL), oil (10 µL), and hexadecane (10 µL) were used for the sliding tests.
Control sample 3.10 ("*") exhibited trails for water, oil and hexadecane sliding.

The effect of PDMS content (wt. %) on the optical transmittance (% T) of the PDMS-PU coatings was evaluated. Various PDMS-PU samples prepared at a constant thickness of 320±1 µm. PU without any PDMS had an optical transmittance of 100% in visible range (λ=540 nm) and was taken as reference. The PDMS-PU films showed % T in the range of 90-95% at 0.5 wt % of PDMS, while PDMS-PU films at 1 wt % PDMS were around 92% T. Further increase in the PDMS wt. % drastically reduced the % T of the films. This decrease in the % T of the samples with increases in the PDMS content suggests phase separation is happening at higher PDMS loads in the matrix, for example above about 2 wt. % or above about 4 wt. %. The results are shown in Table 5.

TABLE 5

PDMS Content (wt %) vs % Transmittance

| Example/Sample | PDMS conc. (wt. %) | hexadecane Sliding angle (°) | hexadecane contact angles | hexadecane advancing angle | hexadecane receding angles | % T |
|---|---|---|---|---|---|---|
| 3.19 | 0 | — | — | — | — | 100 |
| 3.20 | 0.25 | 12 ± 1 | 32 ± 1 | 42 ± 1 | 30 ± 1 | 96 ± 1 |
| 3.21 | 0.5 | 11 ± 1 | 28 ± 1 | 42 ± 1 | 28 ± 1 | 95 ± 1 |
| 3.22 | 1 | 11 ± 1 | 39 ± 1 | 45 ± 1 | 27 ± 1 | 95 ± 1 |
| 3.23 | 2 | 11 ± 1 | 51 ± 1 | 52 ± 1 | 28 ± 1 | 92 ± 1 |
| 3.24 | 4 | 10 ± 1 | 38 ± 1 | 47 ± 1 | 30 ± 1 | 74 ± 1 |
| 3.25 | 8 | 10 ± 1 | 45 ± 1 | 50 ± 1 | 28 ± 1 | 54 ± 1 |

The effect of the thickness of PDMS-PU coatings on the clarity (% T) was evaluated. PDMS-PU films were prepared at 2.0 wt. % PDMS in varying thicknesses, and their % T values were measured. The water and oil-repellency remained essentially the same for the thicknesses in the range of 10-160 µm. Films at lower thicknesses were clearer than thicker films. For example, PDMS films up to 80±2 µm in thicknesses showed excellent optical properties (>97%), while PDMS-coatings at 320±2 µm showed % T reduced to ~88%. For practical applications, films below 80 µm are often used, and in this range, the tested films had good clarity.

The effect of PDMS concentrations on the omniphobicity of the PDMS-PU coatings was also evaluated. Both water- and hexadecane-sliding angles were improved with increasing the amount of PDMS in the PDMS-PU coating because PDMS has good water- and oil-repellency. This is because of the PDMS enrichment on the surface increases with the bulk concentration that renders the surface more omniphobic. Above about 0.25 wt % or 0.5 wt % of PDMS, the water static contact angle levels off (about 100°), while hexadecane showed maximum contact angle at 2.0 wt. % of the PDMS (about 50°). At 1.0 wt % PDMS load, the water sliding angle reached desirable values where water slides at about 17°. Similarly, the optimum values for the hexadecane repellency were achieved at 1.0 wt % for the PDMS at about 17°.

The wear resistance of the PDMS-PU coated samples was evaluated by rubbing samples at 1100 psi for 5000 cycles using a magnetic stir bar wrapped in cotton fabric. The PDMS-PU coatings good wear resistance: No visible scratches were observed after the 5000 rubbing cycles. Also, there were no significant changes in the contact angles for water and hexadecane before and after the rubbing test.

The tensile properties of the control PU and PDMS-PU coatings were evaluated. The PDMS-PU films had similar or better mechanical strength compared to the PU films. Modification with PDMS did not deteriorate or weaken the mechanical properties of the PU films. The tensile property results are shown in Table 6.

TABLE 6

Mechanical Properties Assessment

| Sample# | Strain (%) | Stress (MPa) | Young's Modulus (MPa) | Hardness |
|---|---|---|---|---|
| PU | 30 ± 6 | 18 ± 3 | 300 ± 150 | HB |
| PDMS-PU | 33 ± 15 | 18 ± 2 | 307 ± 92 | HB |
| PDMS-PU (a) | NA | NA | NA | 4H |

Notes:
"NA" denotes the property was not measured. "PDMS-PU (a)" denotes that the PDMS-PU included 2 wt. % POSS as filler, which increased the hardness significantly.

The PDMS-PU coating solution was applied on surfaces other than glass, including wood, metal, and cotton fabric, It was observed that, irrespective of the surface morphology of the coated substrate, the PU-PDMS coated surface had improved water, oil, and hexadecane repellency as compared to uncoated surfaces.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A thermoset omniphobic composition comprising:
   a thermoset polymer comprising a crosslinked backbone, the crosslinked backbone comprising:
   (i) first backbone segments,
   (ii) second backbone segments,
   (iii) third backbone segments,
   (iv) first urethane groups linking the first backbone segments and the third backbone segments, and
   (v) second urethane groups linking the first backbone segments and the second backbone segments;
   wherein:
   the first backbone segments have a structure corresponding to a urethane reaction product from at least one polyisocyanate,
   the second backbone segments have a structure corresponding to a urethane reaction product from at least one hydroxy-functional hydrophobic polymer having a glass transition temperature ($T_g$) of 70° C. or less,
   the third backbone segments have a structure corresponding to a urethane reaction product from at least one polyol,
   the first urethane groups have a structure corresponding to a urethane reaction product of the polyisocyanate and the polyol, and
   the second urethane groups have a structure corresponding to a urethane reaction product of the polyisocyanate and the hydroxy-functional hydrophobic polymer.

2. The composition of claim 1, wherein the polyisocyanate comprises a diisocyanate.

3. The composition of claim 1, wherein the polyisocyanate comprises a triisocyanate.

4. The composition of claim 1, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, isophorone diisocyanate,1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

5. The composition of claim 1, wherein the hydroxy-functional hydrophobic polymer is selected from the group consisting of hydroxy-functional polysiloxanes, hydroxy-functional poly(fluorosiloxanes), hydroxy-functional polyperfluoroethers, hydroxy-functional polybutadienes, hydroxy-functional polyisobutenes, hydroxy-functional branched polyolefins, hydroxy-functional poly(meth)acrylates, hydroxy-functionalized polypropylene glycol, and combinations thereof.

6. The composition of claim 1, wherein the hydroxy-functional hydrophobic polymer comprises a monohydroxy-functional polysiloxane.

7. The composition of claim 1, wherein the hydroxy-functional hydrophobic polymer comprises a dihydroxy-functional polysiloxane.

8. The composition of claim 1, wherein the hydroxy-functional hydrophobic polymer comprises at least three hydroxy groups per polymeric chain.

9. The composition of claim 1, wherein the hydroxy-functional hydrophobic polymer comprises a hydroxy-functional polyperfluoroether.

10. The composition of claim 1, wherein the hydroxy-functional hydrophobic polymer comprises a hydroxy-functional polybutadiene.

11. The composition of claim 1, wherein the hydroxy-functional hydrophobic polymer comprises a hydroxy-functional polyisobutene.

12. The composition of claim 1, wherein the hydroxy-functional hydrophobic polymer comprises a hydroxy-functional branched polyolefin.

13. The composition of claim 1, wherein the hydroxy-functional hydrophobic polymer comprises a hydroxy-functional poly(meth)acrylate.

14. The composition of claim 1, wherein the hydroxy-functional hydrophobic polymer has a glass transition temperature in a range from −150° C. to 70° C.

15. The composition of claim 1, wherein the hydroxy-functional hydrophobic polymer is a liquid at a temperature in a range from −20° C. to 40° C.

16. The composition of claim 1, wherein the hydroxy-functional hydrophobic polymer has a molecular weight ranging from 300 to 200,000 g/mol.

17. The composition of claim 1, wherein the polyol comprises a diol.

18. The composition of claim 1, wherein the polyol comprises three or more hydroxyl groups.

19. The composition of claim 1, wherein the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, polypropylene glycol, 1,3-propanediol, 1,3-butanediol, 1,4-butanediol, isosorbides, neopentyl glycol, 1,6-hexanediol, 1,4-cyclohexanedimethanol, glycerol, trimethylolpropane, 1,2,6-hexanetriol, triglycerides triols/diols from plant oil, castor oil, pentaerythritol, (meth)acrylic polyols, polyester diols, polyester polyols, polyurethane diols, polyurethane polyols, polypropylene glycols, and combinations thereof.

20. The composition of claim 1, wherein at least one of the polyisocyanate and the polyol comprises a biobased polyisocyanate or a biobased polyol, respectively.

21. The composition of claim 1, wherein the first backbone segments are present in an amount ranging from 10 wt. % to 90 wt. % relative to the thermoset polymer.

22. The composition of claim 1, wherein the second backbone segments are present in an amount ranging from 0.01 wt. % to 20 wt. % relative to the thermoset polymer.

23. The composition of claim 1, wherein the third backbone segments are present in an amount ranging from 10 wt. % to 90 wt. % relative to the thermoset polymer.

24. The composition of claim 1, wherein the thermoset polymer crosslinked backbone further comprises:
fourth backbone segments having a structure corresponding to a urethane reaction product of at least one monoisocyanate monomer.

25. The composition of claim 24, wherein the fourth backbone segments are present in an amount ranging from 0.01 wt. % to 4 wt. % relative to the thermoset polymer.

26. The composition of claim 1, further comprising one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, UV inhibitors, electrostatic charge dissipating compounds, and combinations thereof.

27. The composition of claim 1, wherein the composition has a water contact angle in a range from 90° to 120°.

28. The composition of claim 1, wherein the composition has an oil contact angle in a range from 1 to 65°.

29. The composition of claim 1, wherein the composition has a water sliding angle in a range from 1° to 30° for a 75 µl droplet.

30. The composition of claim 1, wherein the composition has an oil sliding angle in a range from 1° to 20° for a 10 µl droplet.

31. The composition of claim 1, wherein the composition has a composite structure comprising:
a solid matrix comprising the first backbone segments and the third backbone segments; and
liquid nanodomains comprising the second backbone segments, the liquid nanodomains being distributed throughout the solid matrix and having a size of 80 nm or less.

32. A coated article comprising:
(a) a substrate; and
(b) a thermoset omniphobic composition according to claim 1, coated on a surface of the substrate.

33. The coated article of claim 32, wherein the substrate is selected from the group of metal, plastics, a different thermoset material, glass, wood, fabric, and ceramics.

34. The coated article of claim 32, wherein the thermoset omniphobic composition has a thickness ranging from 0.01 µm to 500 µm.

35. The coated article of claim 32, wherein the thermoset omniphobic composition coating is scratch-resistant, ink-resistant, dirt-repellent, and optically clear.

36. A method for forming a thermoset omniphobic composition, the method comprising:
(a) reacting at least one polyisocyanate, at least one hydroxy-functional hydrophobic polymer having a glass transition temperature ($T_g$) of 70° C. or less, and at least one polyol to form a partially crosslinked reaction product; and
(b) curing the partially crosslinked reaction product to form the thermoset omniphobic composition.

37. The method of claim 36, comprising reacting the at least one polyisocyanate, the at least one hydroxy-functional hydrophobic polymer, and the at least one polyol to form the partially crosslinked reaction product (i) at temperature from 20° C. to 150° C. and (ii) for a time from 5 min to 1000 min.

38. The method of claim 36, comprising curing the partially crosslinked reaction product to form the thermoset omniphobic composition (i) at temperature from 20° C. to 120° C. and (ii) for a time from 1 hr to 240 hr.

39. The method of claim 36, comprising reacting the at least one polyisocyanate, the at least one hydroxy-functional hydrophobic polymer, and the at least one polyol to form the partially crosslinked reaction product in an aprotic solvent comprising one or more of a ketone, an ester, dimethyl formamide, and dimethyl carbonate.

40. The method of claim 36, comprising mixing while reacting the at least one polyisocyanate, the at least one hydroxy-functional hydrophobic polymer, and the at least one polyol to form the partially crosslinked reaction product.

41. The method of claim 36, wherein reacting the at least one polyisocyanate, the at least one hydroxy-functional hydrophobic polymer, and the at least one polyol to form the partially crosslinked reaction product comprises:
reacting the at least one polyisocyanate and the at least one hydroxy-functional hydrophobic polymer in the absence of the at least one polyol to form an initial reaction product; and;
reacting the at least one polyol with the initial reaction product to form partially crosslinked reaction product.

42. The method of claim 36, wherein curing the partially crosslinked reaction product to form the thermoset omniphobic composition comprises:
adding a casting solvent to the partially crosslinked reaction product;
applying the casting solvent and the partially crosslinked reaction product to a substrate;
drying the substrate to remove the casting solvent, thereby forming a coating of the partially crosslinked reaction product on the substrate; and
curing the coating of the partially crosslinked reaction product on the substrate, thereby forming a coating of the thermoset omniphobic composition on the substrate.

43. The method of claim 42, comprising performing one or more of spraying, casting, rolling, and dipping to apply the casting solvent and the partially crosslinked reaction product to the substrate.

44. The method of claim 36, wherein curing the partially crosslinked reaction product to form the thermoset omniphobic composition comprises:
- applying the partially crosslinked reaction product to a substrate;
- drying the substrate, thereby forming a coating of the partially crosslinked reaction product on the substrate; and
- curing the coating of the partially crosslinked reaction product on the substrate, thereby forming a coating of the thermoset omniphobic composition on the substrate.

45. The method of claim 44, comprising performing one or more of spraying, casting, rolling, and dipping to apply the partially crosslinked reaction product to the substrate.

46. The method of claim 36, comprising:
- reacting the at least one polyisocyanate, the at least one hydroxy-functional hydrophobic polymer, and the at least one polyol to form the partially crosslinked reaction product in a reaction solvent;
- applying the partially crosslinked reaction product in the reaction solvent to a substrate; and
- drying the substrate, thereby removing at least some of the reaction solvent and forming a coating of the partially crosslinked reaction product on the substrate.

* * * * *